(12) United States Patent
Liu et al.

(10) Patent No.: US 10,837,875 B1
(45) Date of Patent: Nov. 17, 2020

(54) SUPPORT FOR PROVIDING IN-PLANE OR OUT-OF-PLANE ELASTIC TORSIONAL RESTRAINT AND EXPERIMENTAL DEVICE INCLUDING SAME

(71) Applicant: Guangzhou University, Guangzhou (CN)

(72) Inventors: Airong Liu, Guangzhou (CN); Yihuan Huang, Guangzhou (CN); Lulu Liu, Guangzhou (CN); Hanwen Lu, Guangzhou (CN); Yonghui Huang, Guangzhou (GP); Jiyang Fu, Guangzhou (CN)

(73) Assignee: GUANGHZOU UNIVERSITY, Guangzhou (CN)

( * ) Notice: Subject to any disclaimer, the term of this patent is extended or adjusted under 35 U.S.C. 154(b) by 0 days.

(21) Appl. No.: 16/924,908

(22) Filed: Jul. 9, 2020

(30) Foreign Application Priority Data

Sep. 18, 2019 (CN) .......................... 2019 1 0878783

(51) Int. Cl.
| | | |
|---|---|---|
| *G01L 1/00* | (2006.01) | |
| *G01M 99/00* | (2011.01) | |
| *G01L 1/04* | (2006.01) | |
| *F16M 11/12* | (2006.01) | |
| *F16M 13/02* | (2006.01) | |

(52) U.S. Cl.
CPC ........... *G01M 99/007* (2013.01); *G01L 1/048* (2013.01); *F16M 11/12* (2013.01); *F16M 13/027* (2013.01)

(58) Field of Classification Search
CPC ...... G01M 99/007; G01L 1/048; F16M 11/12; F16M 11/2071; F16M 13/027; F16M 2200/041

USPC .......................................................... 73/788
See application file for complete search history.

(56) References Cited

U.S. PATENT DOCUMENTS

| | | | | |
|---|---|---|---|---|
| 5,575,488 | A * | 11/1996 | Sholly, Jr. .............. | B23Q 3/068 269/3 |
| 2008/0011927 | A1* | 1/2008 | Park ...................... | F16M 11/12 248/324 |
| 2016/0347346 | A1* | 12/2016 | Simmons ................ | B62D 1/06 |
| 2019/0094674 | A1* | 3/2019 | Lu ......................... | G03B 21/142 |
| 2020/0238502 | A1* | 7/2020 | Lee .......................... | B25J 9/104 |
| 2020/0249468 | A1* | 8/2020 | Yao ....................... | G09G 3/346 |

\* cited by examiner

*Primary Examiner* — Max H Noori
(74) *Attorney, Agent, or Firm* — Getech Law LLC; Jun Ye

(57) ABSTRACT

The present invention discloses a support for providing an in-plane or out-of-plane elastic torsional restraint and an experimental device including the same. The support includes a base formed with two vertical support lugs extending upwards; an inclined strut formed with two swinging portions, where the swinging portions are hingedly connected to the vertical support lugs in pairs; an outer frame part, disposed between the two vertical support lugs, where left and right side portions of the outer frame part are respectively hingedly connected to the vertical support lugs; an inner frame part, disposed inside the outer frame part, a first elastic part, connected between the swinging portion and the outer frame part, to provide a rotational restraint force on the outer frame part; and a second elastic part, connected between the outer frame part and the inner frame part, to provide a rotational restraint force on the inner frame part.

9 Claims, 3 Drawing Sheets

SUPPORT FOR PROVIDING IN-PLANE OR OUT-OF-PLANE ELASTIC TORSIONAL RESTRAINT AND EXPERIMENTAL DEVICE INCLUDING SAME

TECHNICAL FIELD

The present invention relates to the technical field of research on instability of arch structures under a rotational restraint, and in particular, to a support for providing an in-plane or out-of-plane elastic torsional restraint and an experimental device including the same.

BACKGROUND ART

In engineering structures, various supports are used to support and fix structures. These supports have various boundary conditions, and a fixed connection and a hinged connection thereof are relatively familiar. When mechanical performance of the structures is researched, boundary conditions such as the fixed connection and the hinged connection are also strictly used. But in practice, restraints of the engineering structures are not completely the fixed connection or hinged connection, and often fall between the fixed connection and the hinged connection.

In existing research on arch structures, only the fixed connection or the hinged connection is generally considered. However, as the research deepens, scholars found that the two boundary conditions cannot be correctly reflected in mechanical performance of the arch structures. They believe that only elastic torsional restraints can be used to relatively accurately simulate actual situations of the structures.

SUMMARY

To resolve at least one of technical problems existing in the prior art, an objective of the present invention is to provide a support for providing an in-plane or out-of-plane elastic torsional restraint and an experimental device including same, to perform experimental research when a test piece is elastically restrained, especially simulation of mechanical performance when an arch structure is under an in-plane or out-of-plane elastic torsional restraint.

According to an embodiment in a first aspect of the present invention, a support for providing an in-plane or out-plane elastic torsional restraint is provided, including:

a base, formed with two spaced vertical support lugs extending upwards;

an inclined strut, formed with two swinging portions, where the two swinging portions are respectively hingedly connected to the vertical support lugs in pairs, so that the inclined strut is capable of rotating relative to the base;

an outer frame part, disposed between the two vertical support lugs, where left and right side portions of the outer frame part are respectively hingedly connected to the vertical support lugs, so that the outer frame part is capable of rotating relative to the base;

an inner frame part, disposed inside the outer frame part, where upper and lower side portions of the inner frame part are respectively hingedly connected to upper and lower side portions of the outer frame part, so that the inner frame part is capable of rotating relative to the outer frame part;

a first elastic part, detachably connected between the swinging portion and the outer frame part, to provide a rotational restraint force on the outer frame part; and a second elastic part, detachably connected between the inner frame part and the outer frame part, to provide a rotational restraint force on the inner frame part, where a rotation axis of the outer frame part is perpendicular to a rotation axis of the inner frame part.

Beneficial effects: The support may be used to provide different boundary constraint conditions. The support may be used to research in-plane stability or out-of-plane (deviation from a plane in which a structure is located) stability of a test piece under different boundary constraint conditions. When the first elastic parts are disposed, the test piece is restrained by in-plane elastic torsion. When the second elastic parts are disposed, the test piece is restrained by out-of-plane elastic torsion. The support may be used to resolve a difficult problem that a test-piece experimental device can provide only one boundary constraint condition.

In the support for providing the in-plane or out-plane elastic torsional restraint in the embodiment in the first aspect of the present invention, a horizontal protruding shaft is fixedly disposed on each of the left and right side portions of the outer frame part, the two horizontal protruding shafts are respectively rotatably connected to the two vertical support lugs, a vertical protruding shaft is disposed on each of the upper and lower side portions of the inner frame part, the two vertical protruding shafts are respectively hingedly connected to the upper and lower side portions of the outer frame part, the first elastic part is a first torsional spring, the second elastic part is a second torsional spring, the first torsional spring is sleeved on the horizontal protruding shaft, the second torsional spring is sleeved on the vertical protruding shaft, an insertion portion is formed on two ends of the first torsional spring and the second torsional spring, one insertion portion of the first torsional spring is inserted into the swinging portion, and the other insertion portion is inserted into the left and right side portions of the outer frame part; one insertion portion of the second torsional spring is inserted into the upper and lower side portions of the outer frame part, and the other insertion portion is inserted into the upper and lower side portions of the inner frame part.

In the support for providing the in-plane or out-plane elastic torsional restraint in the embodiment in the first aspect of the present invention, the vertical support lug is provided with a first horizontal limiting groove, the swinging portion is provided with a second vertical limiting groove, and a limiting rod is inserted into a cross between the first limiting groove and the second limiting groove.

In the support for providing the in-plane or out-plane elastic torsional restraint in the embodiment in the first aspect of the present invention, the support further includes two fixing rods, where each of the upper and lower side portions of the inner frame part is provided with a pair of through holes, and two ends of the fixing rod are fixedly mounted on the inner frame part after respectively passing through the upper and lower through holes.

In the support for providing the in-plane or out-plane elastic torsional restraint in the embodiment in the first aspect of the present invention, each of the first elastic part and the second elastic part includes a plurality of specifications, and different specifications correspond to different stiffness coefficients.

According to an embodiment in a second aspect of the present invention, an experimental device is provided, including the two supports for providing an in-plane or out-plane elastic torsional restraint, and further including a loading container and an arch structure test piece, where one end of the arch structure test piece is fixedly mounted on an inner frame part of one of the supports, the other end of the arch structure test piece is fixedly mounted on an inner frame part of the other support, and the loading container is connected under a middle portion of the arch structure test piece.

Beneficial effects: The experimental device includes the support for providing the in-plane or out-of-plane elastic torsional restraint. When the experimental device is used to test the arch structure test piece, experimental research when the arch structure test piece is elastically restrained can be met, especially simulation of mechanical performance when the arch structure test piece is under an in-plane or out-of-plane elastic torsional restraint.

The experimental device in the embodiment in the second aspect of the present invention further includes a supply container and a water pump, where the water pump and the supply container communicate with the loading container through tubes.

In the experimental device in the embodiment in the second aspect of the present invention, a drainage switch is disposed at a bottom portion of the loading container.

In the experimental device in the embodiment in the second aspect of the present invention, the arch structure test piece is an I-shaped steel mechanical part.

BRIEF DESCRIPTION OF THE DRAWINGS

The following further describes the present invention with reference to the accompanying drawings and embodiments.

DETAILED DESCRIPTION

This section describes specific embodiments of the present invention in detail. Preferred embodiments of the present invention are shown in the accompanying drawings. The accompanying drawings play a role in supplementing text description of the specification using graphics, so that people can intuitively and visually understand each technical feature and overall technical solutions of the present invention. However, the accompanying drawings cannot be understood as a limitation to the protection scope of the present invention.

In the description of the present invention, it should be understood that orientations or position relationships indicated by terms upper, lower, front, back, left, right, and the like are orientations or position relationships shown in the accompanying drawings, and these terms are merely used to facilitate description of the present invention and simplify the description, but not to indicate or imply that the mentioned apparatus or element must have a specific orientation and must be constructed and operated in a specific orientation. Therefore, these terms cannot be understood as a limitation to the present invention.

In the description of the present invention, being several means being one or more, a plurality means being more than two, and being greater than, less than, exceeding, and the like are understood as excluding the number, and being above, below, within, and the like are understood as including the number. Described terms such as first, second, and the like are used only for the purpose of distinguishing technical features and cannot be understood as indicating or implying relative importance, or implicitly indicating a quantity of the indicated technical features, or implicitly indicating an order of the indicated technical features.

In the description of the present invention, unless otherwise clearly defined, terms such as disposing, mounting, and connection should be broadly understood. Those skilled in the art can reasonably determine specific meanings of the above terms in the present invention with reference to specific content of the technical solutions.

Figure 1:
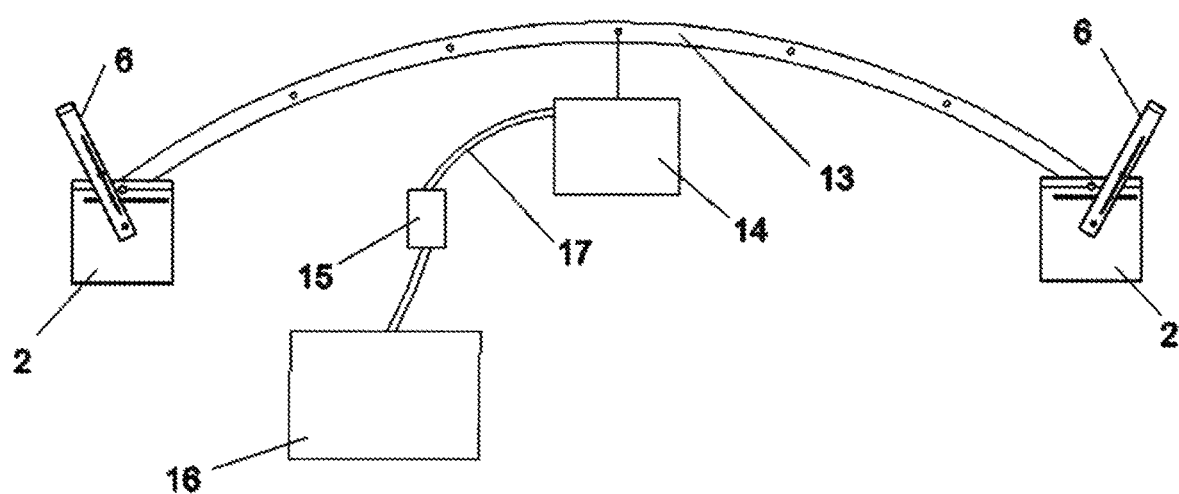
FIG. 1 is a schematic structural diagram of an experimental device according to an embodiment of the present invention.

Referring to FIG. 1, an embodiment of the present invention provides an experimental device. The experimental device is configured to test mechanical performance of an arch structure test piece 13.

The experimental device mainly includes two supports, a loading container 14, a supply container 16, and a water pump 15. Two ends of the arch structure test piece 13 are respectively fixedly mounted on the two supports, the water pump 15 and the supply container 16 communicate with the loading container 14 through tubes 17, and the loading container 14 is hanged under a middle portion of the arch structure test piece 13. The water pump 15 is started, and water in the supply container 16 is continuously transported into the loading container 14, so that the loading container 14 uniformly loads the arch structure test piece 13, and vertical force received by the arch structure test piece 13 continuously increases. The water pump 15 stops working, thereby implementing dead load. In addition, a drainage switch is disposed at a bottom portion of the loading container 14. When the vertical force needs to be reduced, the drainage switch is turned on, and the water in the loading container 14 continuously flows out, so that the loading container 14 uniformly reduces load of the arch structure test piece 13.

To correctly reflect mechanical performance of the arch structure, the support can provide an in-plane or out-of-plane elastic torsional restraint, so that an actual situation of the arch structure test piece 13 can be relatively accurately simulated.

Figure 2:
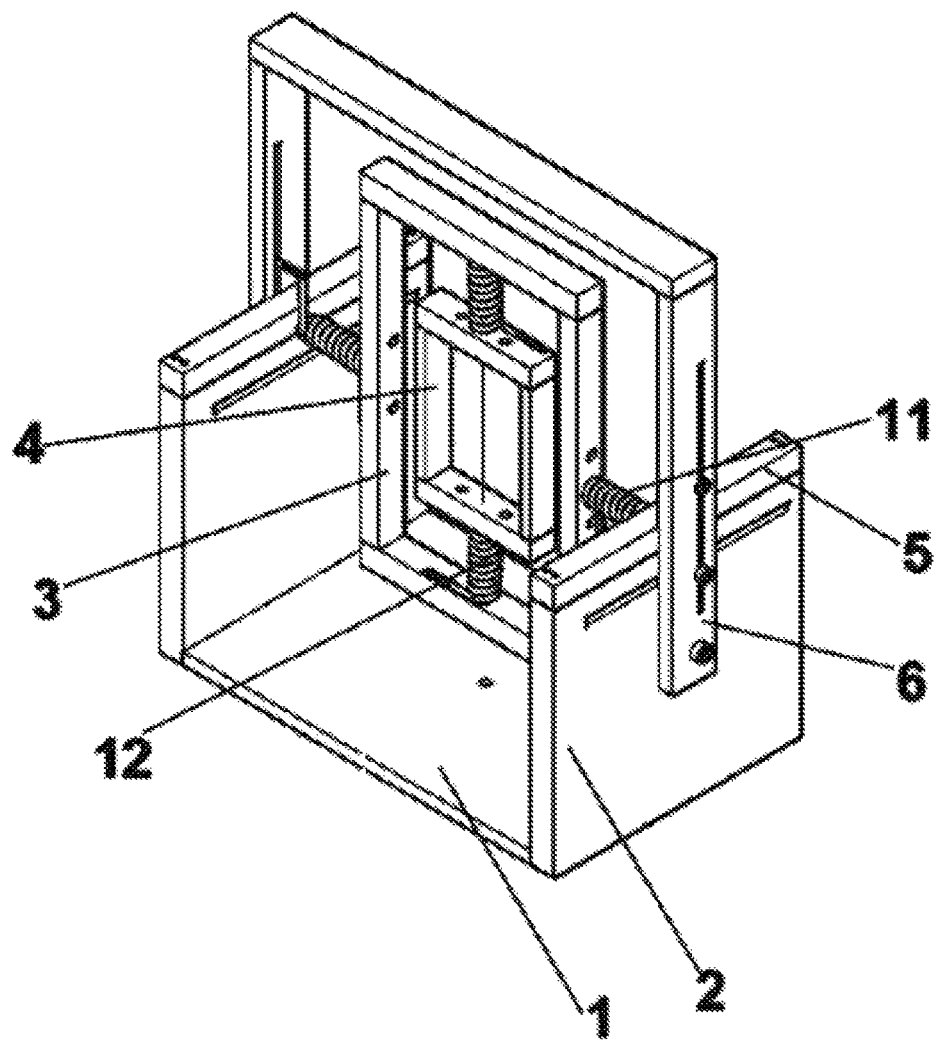
FIG. 2 is a schematic diagram of a stereoscopic structure of a support according to an embodiment of the present invention.
Figure 3:
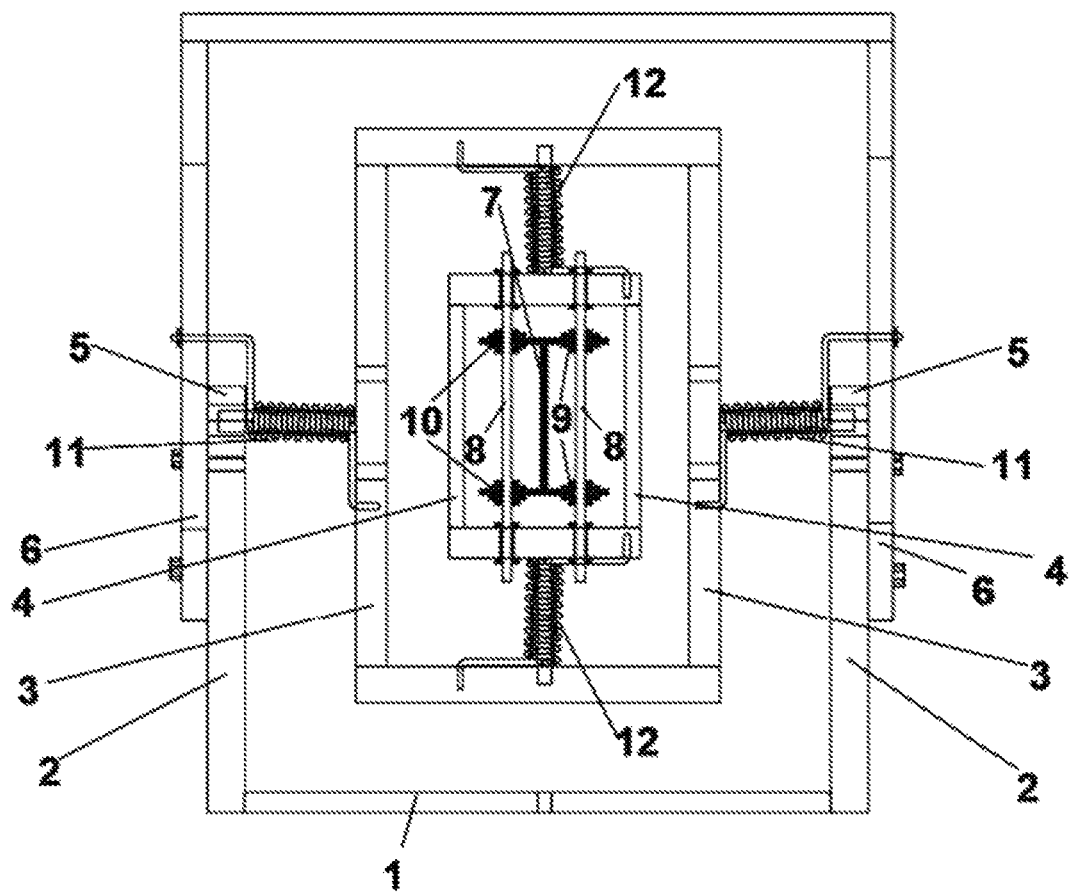
FIG. 3 is a front view of FIG. 2.

Specifically, referring to FIG. 2 and FIG. 3, the support mainly includes a base, an inclined strut 6, an outer frame part 3, an inner frame part 4, a first elastic part, and a second elastic part. The base is integrally designed as a U shape, a bottom portion of the base is a horizontal base block 1, and two side portions of the horizontal base block 1 are vertical support lugs 2 extending upwards. The inclined strut 6 is designed as an inverted U shape. The inclined strut 6 reversely buckles the base, and is hingedly connected to the vertical support lugs 2 by using swinging portions on left and right sides. The connection may be specifically implemented by using pin shafts, so that the inclined strut 6 can swing around the pin shafts.

Both the outer frame part 3 and the inner frame part 4 are tetragonal, a horizontal protruding shaft is fixedly mounted on each of left and right side portions of the outer frame part 3, and a vertical protruding shaft is fixedly mounted on each of upper and lower side portions of the inner frame part 4. A bearing is mounted on each of top portions of the vertical support lugs 2 and upper and lower side portions of the outer frame part 3. The horizontal protruding shaft is inserted into the bearing, so that the outer frame part 3 is hingedly connected in the base. The vertical protruding shaft is inserted into the bearing, so that the inner frame part 4 is hingedly connected in the outer frame part 3. To facilitate mounting of the bearing, the top portion of the vertical support lug 2 is connected to a covering block 5 by using a bolt, and the covering block 5 and the vertical support lug 2 are each provided with a semi-cylindrical groove through machining, and two semi-cylindrical grooves form a cylindrical hole together to mount the bearing.

To provide an elastic restraint force, the first elastic part is mounted between the swinging portion and the outer frame part 3, to provide a rotational restraint force on the outer frame part 3. The second elastic part is mounted between the outer frame part 3 and the inner frame part 4, to provide a rotational restraint force on the inner frame part 4. A rotation axis of the outer frame part 3 is perpendicular to a rotation axis of the inner frame part 4. Specifically, the first elastic part is a first torsional spring 11, the second elastic part is a second torsional spring 12, the first torsional spring 11 is sleeved on the horizontal protruding shaft, the second torsional spring 12 is sleeved on the vertical protruding shaft, an insertion portion is formed on two ends of each of the first torsional spring 11 and the second torsional spring 12, one insertion portion of the first torsional spring 11 is inserted into the swinging portion, and the other insertion portion is inserted into the left and right side portions of the outer frame part 3; one insertion portion of the second torsional spring 12 is inserted into the upper and lower side portions of the outer frame part 3, and the other insertion portion is inserted into the upper and lower side portions of the inner frame part 4. The first elastic part and the second elastic part are both detachably connected, thereby facilitating disassembly and assembly, so as to satisfy simulation of different force situations of the arch structure test piece 13.

The support may be used to provide different boundary constraint conditions. The support may be used to research in-plane stability or out-of-plane (deviation from a plane in which a structure is located) stability of a test piece under different boundary constraint conditions. When the first elastic part is disposed, the test piece is restrained by in-plane elastic torsion. When the second elastic part is disposed, the test piece is restrained by out-of-plane elastic torsion. The support may be used to resolve a difficult problem that a test-piece experimental device can provide only one boundary constraint condition. When the experimental device is used to test the arch structure test piece 13, experimental research when the arch structure test piece 13 is elastically restrained can be met, especially simulation of mechanical performance when the arch structure test piece 13 is under an in-plane or out-of-plane elastic torsional restraint.

Preferably, the apparatus is particularly applicable to a case in which the arch structure test piece 13 is an I-shaped steel mechanical part 7. To fixedly mount the I-shaped steel mechanical part 7 on the inner frame part 4, two fixing rods 8 are disposed on the inner frame part 4, and a pair of through holes is punched on each of the upper and lower side portions of the inner frame part 4. An end portion of the I-shaped steel mechanical part 7 is inserted into the inner frame part 4, the fixing rods 8 pass through the inner frame part 4 and upper and lower flanges of the I-shaped steel mechanical part, the fixing rods 8 are provided with threads, nuts 9 are sleeved on the fixing rods 8, and the nuts 9 are closely attached to upper and lower surfaces of the flange after being tightened. In this way, the arch structure test piece 13 can be fixedly mounted. To ensure fixed and stable mounting of the I-shaped steel mechanical part 7, a gasket 10 is disposed between the nut 9 and the flange.

Further, preferably, the vertical support lug 2 is provided with a first horizontal limiting groove, the swinging portion is provided with a second vertical limiting groove, and a limiting rod is inserted into a cross between the first limiting groove and the second limiting groove. The limiting rod may be a bolt, and the bolt is movably inserted into the cross between the first limiting groove and the second limiting groove. When the support is used for force analysis of the test piece, because different arch structure test pieces have different rise-span ratios, arch feet have different angles. However, after the arch structure test piece is connected to the support, all the inner frame part 4, the outer frame part 3, and the two torsional springs have to rotate to an angle perpendicular to the arch foot. Therefore, the inclined strut 6 also needs to correspondingly rotate to an angle of an insertion portion of a torsional spring in the second limiting groove. After the inclined strut 6 adaptively swings to a required angle, the nut is sleeved on the limiting rod for implementation of tightening, so that the inclined strut 6 can be fixed at a required angle. In addition, a tail end of the insertion portion may also be provided with threads, and is tightened and fixed by using the nut.

In addition, each of the first elastic part and the second elastic part includes a plurality of specifications, and different specifications correspond to different stiffness coefficients. For arch structure test pieces 13 having different strength, torsional springs having different stiffness coefficients may be used for replacement, to meet an experiment requirement.

The implementations of the present invention are described in detail above with reference to the accompanying drawings, but the present invention is not limited to the above implementations. Within a scope of knowledge possessed by those skilled in the art, various changes can be made without departing from the purpose of the present invention.

What is claimed:

1. A support for providing an in-plane or out-plane elastic torsional restraint, comprising:
    a base, formed with two spaced vertical support lugs extending upwards;
    an inclined strut, formed with two swinging portions, wherein the two swinging portions are respectively hingedly connected to the vertical support lugs in pairs, so that the inclined strut is capable of rotating relative to the base;
    an outer frame part, disposed between the two vertical support lugs, wherein left and right side portions of the outer frame part are respectively hingedly connected to the vertical support lugs, so that the outer frame part is capable of rotating relative to the base;
    an inner frame part, disposed inside the outer frame part, wherein upper and lower side portions of the inner frame part are respectively hingedly connected to upper and lower side portions of the outer frame part, so that the inner frame part is capable of rotating relative to the outer frame part;
    a first elastic part, detachably connected between the swinging portion and the outer frame part, and providing a rotational restraint force on the outer frame part; and
    a second elastic part, detachably connected between the inner frame part and the outer frame part, and providing a rotational restraint force on the inner frame part, wherein
    a rotation axis of the outer frame part is perpendicular to a rotation axis of the inner frame part.

2. The support for providing the in-plane or out-plane elastic torsional restraint according to claim 1, wherein a horizontal protruding shaft is fixedly disposed on each of the left and right side portions of the outer frame part, the two horizontal protruding shafts are respectively rotatably connected to the two vertical support lugs, a vertical protruding shaft is disposed on each of the upper and lower side portions of the inner frame part, the two vertical protruding shafts are respectively hingedly connected to the upper and lower side portions of the outer frame part, the first elastic part is a first torsional springs, the second elastic part is a second torsional spring, the first torsional spring is sleeved on the horizontal protruding shaft, the second torsional spring is sleeved on the vertical protruding shaft, an insertion portion is formed on two ends of each of the first torsional spring and the second torsional spring, one insertion portion of the first torsional spring is inserted into the swinging portion, and the other insertion portion is inserted into each of the left and right side portions of the outer frame part; one insertion portion of the second torsional spring is inserted into each of the upper and lower side portions of the outer frame part, and the other insertion portion is inserted into each of the upper and lower side portions of the inner frame part.

3. The support for providing the in-plane or out-plane elastic torsional restraint according to claim 1, wherein the vertical support lug is provided with a first horizontal limiting groove, the swinging portion is provided with a second vertical limiting groove, and a limiting rod is inserted into a cross between the first limiting groove and the second limiting groove.

4. The support for providing the in-plane or out-plane elastic torsional restraint according to claim 1, further comprising two fixing rods, wherein each of the upper and lower side portions of the inner frame part is provided with a pair of through holes, and two ends of the fixing rod are fixedly mounted on the inner frame part after respectively passing through the upper and lower through holes.

5. The support for providing the in-plane or out-plane elastic torsional restraint according to claim 1, wherein each of the first elastic part and the second elastic part comprises a plurality of specifications, and different specifications correspond to different stiffness coefficients.

6. An experimental device, comprising the two supports for providing the in-plane or out-plane elastic torsional restraint according to claim 1, and further comprising a loading container and an arch structure test piece, wherein one end of the arch structure test piece is fixedly mounted on an inner frame part of one of the supports, the other end of the arch structure test piece is fixedly mounted on an inner frame part of the other support, and the loading container is connected under a middle portion of the arch structure test piece.

7. The experimental device according to claim 6, further comprising a supply container and a water pump, wherein the water pump and the supply container communicate with the loading container through tubes.

8. The experimental device according to claim 7, wherein a drainage switch is disposed at a bottom portion of the loading container.

9. The experimental device according to claim 6, wherein the arch structure test piece is an I-shaped steel mechanical part.

* * * * *